Oct. 11, 1966   R. P. VAN DRIESEN   3,278,417
PROCESS FOR HYDROCRACKING NITROGEN CONTAINING HYDROCARBON OILS
Filed Feb. 21, 1964
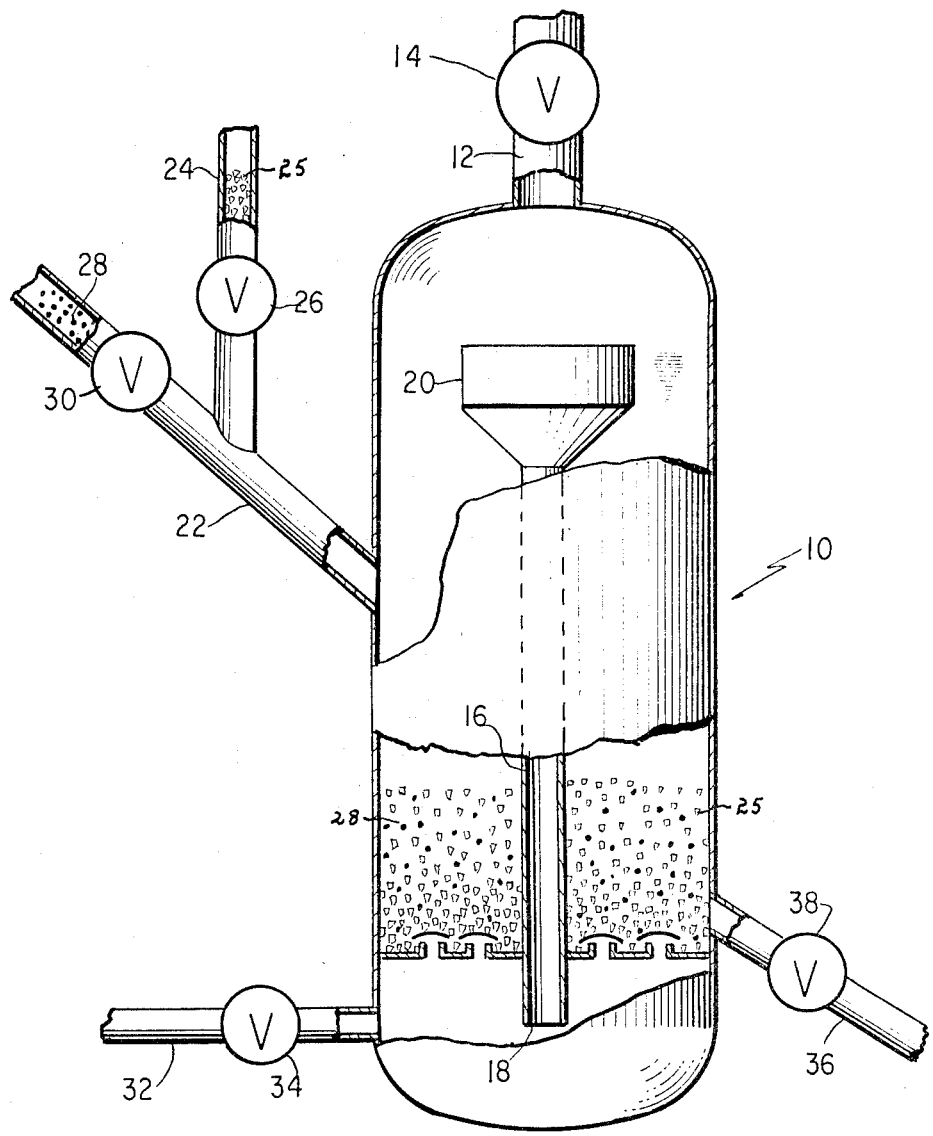
INVENTOR
ROGER VAN DRIESEN
BY
ATTORNEY United States Patent Office 3,278,417
Patented Oct. 11, 1966

3,278,417
PROCESS FOR HYDROCRACKING NITROGEN CONTAINING HYDROCARBON OILS
Roger P. Van Driesen, Hopewell, N.J., assignor to Cities Service Research and Development Company, New York, N.Y., a corporation of New Jersey
Filed Feb. 21, 1964, Ser. No. 346,562
2 Claims. (Cl. 208—108)

This invention relates to a process for the catalytic conversion of hydrocarbon oils in the presence of hydrogen into more desirable hydrocarbon products. More particularly, it relates to a technique for conducting such reactions so as to prolong the productive life of catalyst between regenerations and to control the products produced by the catalytic conversion.

In hydrocracking operations a mass of catalyst particles is maintained within an enclosed reaction zone. It is well-known that two basic reactions occur in a hydrocracking operation, cracking and hydrogenation. The catalysts customarily employed will contain one or more components which catalyze the hydrogenation reaction and one or more components which catalyze the cracking reaction. Each reaction proceeds at a measurable rate and, as an ideal goal, the rates of these two reactions are in balance so that the over-all reaction achieves conversion of the reactant to the desired products with a suitably low deposition of carbonaceous contaminant on the catalyst and with a minimum of poisoning such as occurs from organic nitrogen compounds in the feed.

The cracking activity of fresh catalyst, particularly initially, diminishes much more rapidly than hydrogenation activity of catalyst. This is especially so when the nitrogen content of the feed is above 10 p.p.m. Thus, in conversions with a normal inventory of fresh hydrocracking catalyst the initial conversions will not be in balance; consequently undesirably high deposits of coke and organo-nitrogen compounds build up on the catalyst during initial conversions. A balance is eventually obtained by aging of the catalyst in use; also the unbalanced condition can be partially offset by using a reaction temperature lower than that employed in normal operation for the desired conversions. However, in the first case the balance obtained is unnecessarily low in cracking activity. In the second case using low reaction temperatures with high nitrogen content feeds, e.g., feeds containing at least 10 parts per million (p.p.m.), by weight, of nitrogen results in both permanent and temporary nitrogen poisoning of the catalyst. Additionally, it is often not desirable to change temperature in a reactor since although it may beneficially affect one reaction product it can be deleterious to other products and reactions occurring simultaneously in the reactor. Moreover, it is usually desirable to have the distribution and quality of products under control so that refinery and marketing conditions will be determining rather than restrictions in the hydrocracking process.

The addition of acidic (cracking) characteristics to the base of hydrogenation catalyst, i.e., a dual function catalyst, has resulted in a catalyst capable of high conversion of various relatively high molecular weight oils to relatively low molecular weight oils such as gasoline and light distillates. In general these catalysts are used in a cracking stage after the oil has been processed in a treating stage with a non-acidic, i.e., non-cracking, hydrogenation catalyst. The amount of cracking that occurs is dependent on the feed characteristics, temperature, space velocity, activity and quantity of cracking catalyst. Once a unit design has been decided and an installation made, the degree of variation of these operating conditions including the total quantity or normal inventory of catalyst in the reactor, is necessarily limited. Thus, if there is reason to vary the degree of conversion, a fixed unit design and a given catalyst acidity, limit the ability to do this. The need to vary the conversion can be due to any of several factors, e.g., seasonal variations in demand between motor fuels and heating fuels, variation of the feedstock to the overall refinery, changes in the refinery economics, etc.

It is an object of this invention to provide a hydrocracking process for conserving total catalyst consumption and for providing more efficient operation of a reactor.

It is another object of this invention to provide a process for initiating a hydrocracking reaction with fresh catalyst without the production of large quantities of undesired products.

It is still another object of this invention to provide a hydrocracking process wherein changes in reaction product can be effected without materially changing the reaction conditions such as temperature and pressure.

Briefly, the above objects of the invention are met by adding catalyst or simultaneously withdrawing and adding catalyst to a reactor containing a catalyst charge wherein the added catalyst has a ratio of cracking to hydrogenation activity substantially different from that of the initial catalyst charge or of the catalyst in the reactor at the time of addition while maintaining substantially the same reaction conditions in the reactor. Thus, in the process of this invention, when using fresh catalyst in a reactor without substantial quantities of used (or equilibrium) catalyst the reactor is charged with a quantity of fresh hydrocracking catalyst which is less than the normal inventory of catalyst for the reaction, and the total inventory is built up during the initial operating period by incremental additions of either fresh or used (equilibrium) catalyst having a higher ratio of cracking activity to hydrogenation activity as compared to such activities of the initial partial fresh catalyst charge while maintaining all other conditions in the reaction zone substantially constant. The incremental additions effectively compensate for the initial rapid decline in cracking activity of fresh catalyst. Preferably, the initial charge is composed of a mixture of dual function catalyst and of hydrogenation catalyst having little or no cracking activity, whereas the incremental additions are of a larger percentage of the same dual function catalyst and a lower percentage of the same hydrogenation catalyst. Alternately, the reactor can be fully charged with equilibrium catalyst having a certain ratio of cracking activity to hydrogenation activity to produce a desired product ratio and when it is desired to change the product ratio, there can be made additions of catalyst having a cracking to hydrogenation activity ratio which is different from that in the reactor, while maintaining the reaction conditions including temperature and pressure substantially the same in order to give conversions to different product ratios, e.g., a different ratio of gasoline to middle distillate. The term fresh catalyst as used herein refers to unused catalyst such as that which does not have carbon build up. The term equilibrium catalyst refers to a used catalyst wherein a certain quantity of carbon and other contaminants have accumulated, but it is feasible to maintain the overall quantity of contaminants constant for the entire catalyst inventory by adding small quantities of fresh or regenerated catalyst and withdrawing equal quantities of equilibrium catalyst.

A number of advantages are provided by the process of this invention. It allows operation at the optimum hydrocracking temperatures over a wide range of conversions, and the use of hydrogenation catalyst in the same reactor with dual function hydrocracking catalyst allows more complete removal of nitrogen and sulfur on the lighter fractions. Thus the initial operation with fresh catalyst can be made at the relatively higher reactor temperatures expected during equilibrium catalyst operation in treating high nitrogen containing oil without poisoning the catalyst. By operating in the manner of this invention conversions can be controlled so that undesirable product distribution is not experienced during the startup period with the consequent high level of carbon and organo-nitrogen laydown on the catalyst. Also, by operating in the manner of this invention, the product distribution can be changed without changing the reaction temperature or pressure.

The individual catalyst particles can be those which are effective in hydrogenating hydrocarbons without substantial cracking activity, catalyst particles which are effective in cracking hydrocarbons without substantial hydrogenation activity and dual function catalyst which have substantial activity in both the hydrogenation and cracking of hydrocarbons. Generally it is not desirable to employ cracking catalyst particles substantially free of hydrogenation activity in hydrocracking operations because of decreased efficiency and high carbon build up on the catalyst. Therefore, the preferred catalyst employed in this invention is dual function catalyst or a mixture of hydrogenation catalyst and dual function catalyst. As used herein the term hydrogenation catalyst refers to such catalyst without cracking activity. The term cracking catalyst refers to such a catalyst which does not have hydrogenation activity; whereas hydrocracking or dual function catalyst refers to a catalyst having both hydrogenation activity and cracking activity.

A catalyst mass having the desired ratio of cracking to hydrogenation activity can be selected from among the many catalysts and mixtures thereof known in the art. Also, the ratio of cracking to hydrogenating activity can be measured in the manner well known in the art. For example, in measuring hydrogenation activity, a standard 400° F. to 700° F. gas oil having a gravity of 30° API, a nitrogen content of 30 p.p.m. and a diesel index of 42 may be passed over the catalysts under test at identical operating conditions, for example, 750° F. reactant inlet temperature, a space velocity of one volume of reactant (measured as 60° F. liquid) per volume of catalyst per hour, a reactor hydrogen pressure of 1500 pounds per square inch guage and a hydrogen circulation to the reactor of 5,000 standard cubic feet of hydrogen per barrel of reactant. A 400° F. to 650° F. fraction would then be removed from each reactor effluent and the aniline point (A.S.T.M. test 611–53T) and A.P.I. gravity (A.S.T.M. test D–387–54) of the fraction determined. The diesel index may then be calculated for each fraction as the product of the aniline point and A.P.I. gravity divided by 100. The higher the diesel index, the greater the hydrogenation activity of the catalyst.

The cracking activity of catalyst may be determined by passing a straight run paraffinic gas oil, boiling between 400° F. and 700° F., over the catalysts under test. The same operating conditions as those employed in the hydrogenation test are used except that a space velocity of 3 volumes of feet per hour per volume of reactor space is used. The volume of material in the product which boils below 400° F. is measured. The greater this volume, the greater the cracking activity. In order to distinguish between the different catalysts for the purpose of this invention, a catalyst having cracking activity is one which from this test converts at least 5% of the feed to material boiling below 400° F. A catalyst which does not convert at least 5% of the feed to material boiling below 400° F. by the above test is, therefore, not a cracking catalyst as contemplated herein.

As indicated hereinabove, any catalyst mass having hydrogenation activity, cracking activity or both hydrogenation activity and cracking activity can be employed in this invention. As non-limiting examples the catalyst can be composed of nickel, molybdenum, platinum, palladium, ruthenium, tungsten or cobalt or the oxides or sulfides of these materials deposited on an alumina, silica-alumina, silica zirconia or silica magnesia base. The catalyst mass can be a dual function catalyst, a mechanical mixture of hydrogenation and cracking components, an alternate layer of hydrogenation catalyst and dual function catalyst, etc. Illustrative of catalyst having a high cracking activity there can be mentioned those of hydrated aluminum silicates. These cracking catalysts may be either activated (acid treated) natural clays of the bentonite type or synthesized silica-aluminum or silica-magnesia. Illustrative of hydrogenation catalyst having a high hydrogenating activity there can be mentioned those of nickel, cobalt, platinum, etc.

The catalyst employed in this invention is in particulate form such as beads, chips, pellets, spheres, granules, extrusions, etc. The particle size of the catalyst can vary over a wide range. Illustratively the particle size of the catalyst can be from about 10 microns to about ¼ of an inch or more. Preferably the particle size of the catalyst is from about 1/32 of an inch to about 1/8 of an inch.

Hydrogen feed to the reactor can be substantially pure hydrogen or part of a hydrogen-containing gas, such as recycle gas containing hydrogen as well as normally gaseous hydrocarbons. The quantity of hydrogen introduced will depend on the particular reaction desired. Hydrogen can be introduced into the reactor at rates between about 1,000 and 30,000 standard cubic feet (s.c.f.) per barrel of feed with between about 2,500 and 10,000 s.c.f. per barrel of feed being preferred.

The liquid hydrocarbon feed is preferably a heavy hydrocarbon such as one wherein at least 50%, by volume, boils in excess of 500° F. Illustrative of suitable liquid hydrocarbon feedstocks which are advantageously hydrocracked in the process of this invention there can be mentioned: cycle oils or gas oils, thermal gas oils, coker distillates, vacuum gas oils or deasphalted gas oils derived from crude petroleum, natural tar and bitumen from tar sands and the like. The hydrocarbon feed advantageously has a boiling range between about 350° F. and about 1100° F., with more than about 50% boiling in excess of 650° F. In a preferred embodiment of the invention the hydrocarbon feed contains at least 100 parts per million (p.p.m.) by weight of organic nitrogen and particularly at least about 500 p.p.m. of such nitrogen. With nitrogen content above 100 p.p.m. the reaction temperature is preferably between about 600° F. to about 800° F. and particularly from about 730° F. to 790° F. since lower temperatures cause nitrogen poisoning of the catalyst.

In the process of this invention it is advantageous to have the particulate catalyst mass expanded by the upward flow of fluids in the reactor, e.g., an ebullated bed as described in U.S. Patent 2,987,465 to E. J. Johanson. In the use of an expanded catalyst mass or ebullated bed, the gross volume of the mass of catalyst expands without, however, a substantial quantity of the catalyst particles being carried away by the upflowing fluids, and, therefore, a fairly well-defined upper level of randomly moving particles establishes itself in the upflowing liquid. The fluid flow rate in the reactor can be easily controlled within conventional space velocities and recirculation of fluids within the reactor as described herein to prevent catalyst particles from being carried away. The space velocity in the reactor can vary widely such as between about 0.1 and about 5.0 volumes of feed per hour per volume of reactor capacity. A vertical open ended draft tube in the reactor can be used to effect recirculation or recycle with recycle rates varying from about 5 to about 25 volumes of recycled liquid per volume of fresh hydrocarbon feed being preferred. Optionally, a grid can also be placed at the top of the catalyst mass.

Additions with or without simultaneous partial withdrawals of catalyst to the reactor are facilitated by the use of an expanded bed since the catalyst particles quickly become admixed in the reaction zone with the catalyst present in the reactor.

For maximum utilization of a given reactor, catalyst is generally used in quantities sufficient to provide an average concentration of at least 15 and preferably 25 pounds per cubic foot of ebullated contact zone.

The reaction vessel may be maintained under any suitable pressure such as between about 500 to about 4,000 p.s.i.g. partial pressure of hydrogen with between about 1,000 and 2,000 p.s.i.g. being preferred.

Products which may be recovered from the reactions described hereinabove include normally gaseous products boiling below about 75° F., middle distillate boiling between 400° F.–450° F. and 650° F.–700° F., and a gasoline fraction boiling between about 100° F. to about 400° F.–450° F.

The following example and the drawing further illustrate the invention. Coker gas oil having an API gravity of 12, nitrogen content of 3890 parts per millon by weight, sulfur content of 3.8% by weight, and a boiling range of 650° F. to 920° F. is used as the feedstock. The gas oil is fed into reactor 10 through line 32 and valve 34. The gas oil is fed into reactor 10 at a rate of 0.21 barrel of oil per day per pound of fresh hydrocracking (dual function) catalyst 25 composed of nickel oxide-tungsten oxide composite supported on an alumina-silica carrier which is placed in reactor 10, prior to the introduction of oil, through valve 26 and line 22. In addition to the hydrocracking catalyst, an equal quantity of hydrogenation catalyst 28 composed of cobalt-molybdenum on alumina is placed in the reactor, prior to the introduction of oil, through valve 30 and line 22. The total initial charge of hydrogenation catalyst and dual function catalyst represent 50% of the normal catalyst inventory for the reactor. Hydrogen is fed with the oil through line 32 and valve 34 at 10,000 standard cubic feet per barrel of feed. Pressure is maintained at 2100 p.s.i.g. and temperature at 770° F. The oil feed and hydrogen pass upwardly through the catalyst mass and expand the volume of the catalyst mass to about 50% of its settled volume. The oil is hydrocracked in contact with the catalyst mass and recirculation is provided in the reactor by liquid passing downwardly through open ended draft tube 16 having a funnel top 20 and discharge opening 18. The products recovered from outlet 12 and valve 14 include 65% gasoline based on the volume of fresh feed and 50% of middle distillate based on the volume of fresh feed. The nitrogen content in the products is only 60 p.p.m. There is initially a rapid decline of cracking activity in the catalyst mass requiring the addition of fresh dual function catalyst 25 approximately equal to the initial charge of dual function catalyst during the first two operating days. An amount of catalyst equal to 25% of the normal inventory is made by additions of dual function catalyst 25 in daily increments of 3% to 4% over the next seven operating days to complete the normal catalyst inventory.

It is then possible to maintain the desired conversion ratio of gasoline to middle distillate by removing approximately 1% of total catalyst inventory each day and replacing it with an equal quantity of dual function catalyst. The reactor is run for another three months under this procedure and the product fractions are substantially identical throughout the entire period of operation, including the period when the reactor 10 was operated with only 50% of the normal catalyst inventory. In order to produce a greater quantity of middle distillate, 70%, by weight, of the catalyst in the reactor 10 is removed through valve 38 and line 36 of reactor 10 and replaced with an equal quantity of hydrogenation catalyst 28 from valve 30 and line 22 having substantially no cracking activity. The reaction is run with the same feed and in the same manner as described hereinbefore but the recovered products now include 85% of middle distillate, based on the volume of fresh feed, and only 25% of gasoline, based on the volume of fresh feed.

The phrase, "hydrocarbons boiling within the gasoline boiling range" or simply "gasoline," as used herein refers to hydrocarbons boiling at a temperature of from about 100° F. to about 400° F. or 450° F. The term "middle distillate" as used herein refers to those hydrocarbon fractions having an initial boiling point within the range of about 400° F. to about 450° F. and end boiling point within the range of about 650° F. to about 700° F.

The term "normal catalyst inventory" refers to the quantity of catalyst normally used in the particular reaction zone to effect the desired conversion. Generally it will be predetermined by the design of the reactor although satisfactory prolonged operation can be effected by using from about 0.8 to about 1.2 of the normal catalyst inventory.

In hydrocracking with an inventory of fresh hydrocracking catalyst it is preferred that the initial charge be from about 30% to about 70% of the normal catalyst inventory, and that catalyst be added in increments to arrive at the full or normal inventory of catalyst and as explained hereinbefore, the ratio of cracking activity to hydrogenation activity of the incremental additions, or at least the total of such additions in bringing the quantity of catalyst in the reactor to the normal catalyst inventory, is higher than that of the catalyst in the initial charge.

When it is desired to change the conversion ratio of products produced such as in the case when it is desired to produce greater quantities of gasoline than middle distillate or vice versa, while leaving a part of the catalyst from previous operations in the reactor, from about 80% to about 20%, and preferably from about 75% to about 40% of the catalyst, by weight, in the reactor is removed and replaced with catalyst having a different ratio of cracking to hydrogenating activity than the ratios of such activities of the catalyst remaining in the reactor.

Illustratively when it is desired to increase the quantity of product boiling in the gasoline distillate range or to produce more gasoline as compared to middle distillate, in a process producing a larger quantity of product in the middle distillate range, from about 75% to about 40% of the catalyst in the reactor can be removed and replaced with hydrocracking catalyst having a higher ratio of cracking to hydrogenating activity as compared to the catalyst remaining in the reactor.

In making catalyst additions having a different ratio of cracking to hydrogenation activity as compared to catalyst in the reactor or of the initial fresh charge it is preferred that the ratios of these activities for the different catalysts differ by at least 5% and particularly by at least 10%. This can be computed by simply comparing the cracking activity by conventional techniques such as by the methods described hereinbefore for measuring cracking activity. Illustratively, the cracking to hydrogenating ratio of a catalyst mass can be defined as the percentage of standard dual function catalyst A which when blended with standard hydrogenation catalyst B will yield the same milliliters of hydrocarbon boiling below 400° F. under the test conditions for dual function hydrocracking described earlier.

What is claimed is:

1. A catalytic hydrocracking process which comprises passing a mixture of hydrogen and a heavy hydrocarbon oil upwardly in a reaction zone through a catalyst mass having both hydrogenating and cracking activity, the quantity of said catalyst mass being from about 0.3 to about 0.7 of the normal catalyst inventory and consisting essentially of fresh hydrocracking catalyst in particulate form, said reaction zone maintained under hydrocracking reaction conditions which include a reaction temperature of from about 700° F. to about 800° F. wherein a major portion of said oil is in the liquid phase and contains at least 100 p.p.m. of nitrogen, by weight, said upwardly flowing mixture expanding the catalyst mass by about 10% to about 300% based on its settled volume, making incremental additions of hydrocracking catalyst to the catalyst mass in the reaction zone to bring the total quantity of catalyst in the reaction to about 0.8 to about 1.2 of the normal catalyst inventory wherein the ratio of cracking activity to hydrogenation activity of the incremental additions is at least 5% greater than that ratio of such activities of fresh catalyst in the initial quantity of catalyst in the reaction zone.

2. The process of claim 1 wherein the hydrocarbon oil contains at least 500 parts per million, by weight, of nitrogen and the reaction temperature is maintained between about 730° F. to about 790° F.

References Cited by the Examiner

UNITED STATES PATENTS

| | | | |
|---|---|---|---|
| 2,361,978 | 11/1944 | Swearingen | 208—120 |
| 2,980,604 | 4/1961 | Adams et al. | 208—111 |
| 2,987,465 | 6/1961 | Johanson | 208—109 |

DELBERT E. GANTZ, *Primary Examiner.*

PAUL M. COUGHLAN, *Examiner.*

A. RIMENS, *Assistant Examiner.*

UNITED STATES PATENT OFFICE
CERTIFICATE OF CORRECTION

Patent No. 3,278,417                                October 11, 1966

Roger P. Van Driesen

It is hereby certified that error appears in the above numbered patent requiring correction and that the said Letters Patent should read as corrected below.

In the heading to the printed specification, lines 4, 5 and 6, for "assignor to Cities Service Research and Development Company, New York, N. Y., a corporation of New Jersey," read -- assignor, by mesne assignments, to Cities Servi Research and Development Company, a corporation, of Delaware --.

Signed and sealed this 5th day of September 1967.

(SEAL)
Attest:

ERNEST W. SWIDER                                EDWARD J. BRENNER
Attesting Officer                                     Commissioner of Patents